United States Patent [19]
Sorensen

[11] Patent Number: 5,467,855
[45] Date of Patent: Nov. 21, 1995

[54] RAMP WEIGHT-REDUCING ASSEMBLY

[75] Inventor: Birk C. Sorensen, Whittier, Calif.

[73] Assignee: EMTEK Products, Inc., City of Industry, Calif.

[21] Appl. No.: 268,244

[22] Filed: Jun. 29, 1994

[51] Int. Cl.⁶ .................................................. B65G 11/00
[52] U.S. Cl. ................................... 193/5; 414/537
[58] Field of Search .................... 14/69.5, 71.1, 14/71.3; 414/537; 193/5, 6

[56] References Cited

U.S. PATENT DOCUMENTS

| | | | |
|---|---|---|---|
| 2,370,427 | 7/1944 | Sherry | 214/85 |
| 3,458,073 | 7/1969 | Dawson | 214/450 |
| 3,511,393 | 5/1970 | Abromavage et al. | 214/85 |
| 3,711,882 | 1/1973 | Iller | 14/72 |
| 3,730,361 | 5/1973 | Haynes | 214/85 |
| 3,870,179 | 3/1975 | Colpitts | 214/451 |
| 3,933,258 | 1/1976 | Forsyth et al. | 214/85 |
| 4,078,678 | 3/1978 | Tordella | 214/85 |
| 4,131,209 | 12/1978 | Manning | 214/85 |
| 4,198,187 | 4/1980 | Mountz | 414/537 |
| 4,242,032 | 12/1980 | Whiteman et al. | 414/537 |
| 4,294,571 | 10/1981 | Tordella | 414/537 |
| 4,601,632 | 7/1986 | Agee | 414/537 |
| 4,657,233 | 4/1987 | Vroom | 414/537 X |
| 4,685,857 | 8/1987 | Goeser et al. | 414/522 |
| 4,722,109 | 2/1988 | Mountz | 14/71.1 |
| 4,759,682 | 7/1988 | Hood | 414/537 |
| 4,850,788 | 7/1989 | Dickson | 414/537 |
| 4,900,217 | 2/1990 | Nelson | 414/537 |
| 4,929,018 | 5/1990 | Carty | 296/204 |
| 4,958,979 | 9/1990 | Svensson | 414/549 |
| 5,026,243 | 6/1991 | Dell | 414/401 |
| 5,052,879 | 10/1991 | Wolfe | 414/541 |
| 5,094,583 | 3/1992 | Bills, Jr. et al. | 414/537 |
| 5,133,634 | 7/1992 | Gingrich et al. | 414/537 |
| 5,145,310 | 9/1992 | Calzone | 414/537 |
| 5,199,150 | 4/1993 | Mortenson | 414/537 X |
| 5,306,113 | 4/1994 | Mann | 414/537 |
| 5,340,267 | 8/1994 | Stoll et al. | 14/71.1 X |

FOREIGN PATENT DOCUMENTS

| | | |
|---|---|---|
| 2346050 | 9/1973 | Germany . |
| 58-93631 | 11/1981 | Japan . |
| 2009097A | 1/1979 | United Kingdom . |

OTHER PUBLICATIONS

Todco Rollaramp Specification.
Todco Spring Assist Rollaramp Update.

Primary Examiner—James R. Bidwell
Attorney, Agent, or Firm—Small Larkin & Kidde

[57] ABSTRACT

A ramp weight-reducing assembly which reduces the weight of a ramp manually lifted up to the working surface of a vehicle bed by an operator to then couple the ramp with the bed to maintain the ramp in load-bearing position. The assembly is simple in design, easy to manufacture and low in cost which will allow the manufacturer to offer the assembly to the majority of ramp users at a minimal price. The ramp weight-reducing assembly includes a ramp and a ramp connector, modified to accept a weight-reducing spring assembly between the ramp and ramp connector legs. The spring assembly includes a piston rod coupled to the ramp having a stop, inserted into a main compression spring which is then inserted into a hole in a support bar that spans the two connector legs running parallel to each other. The spring assembly also includes two supplemental springs attached to plates between the ramp and ramp connector. The springs cooperate to reduce the weight lifted by an operator raising or lowering the ramp.

7 Claims, 5 Drawing Sheets

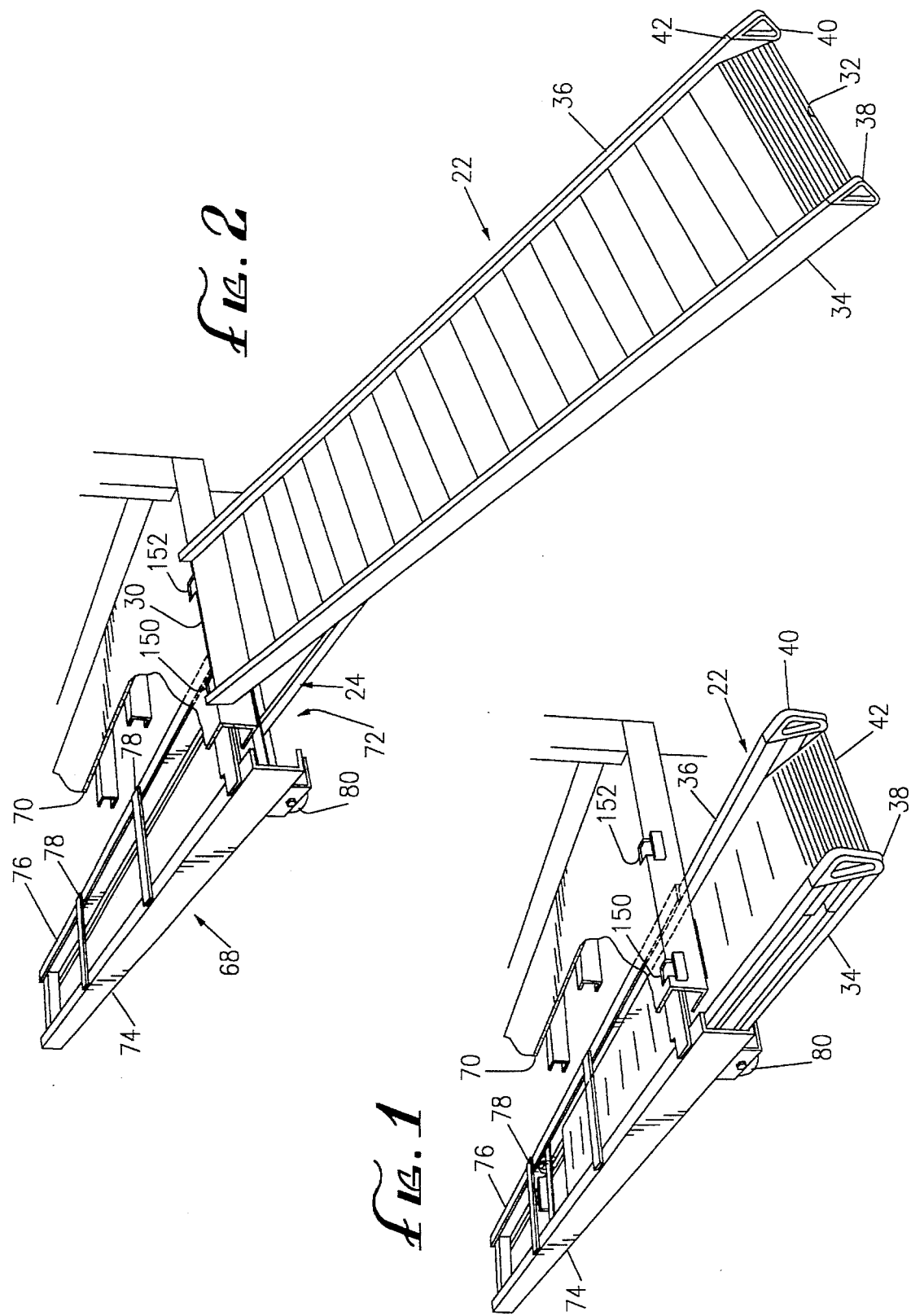

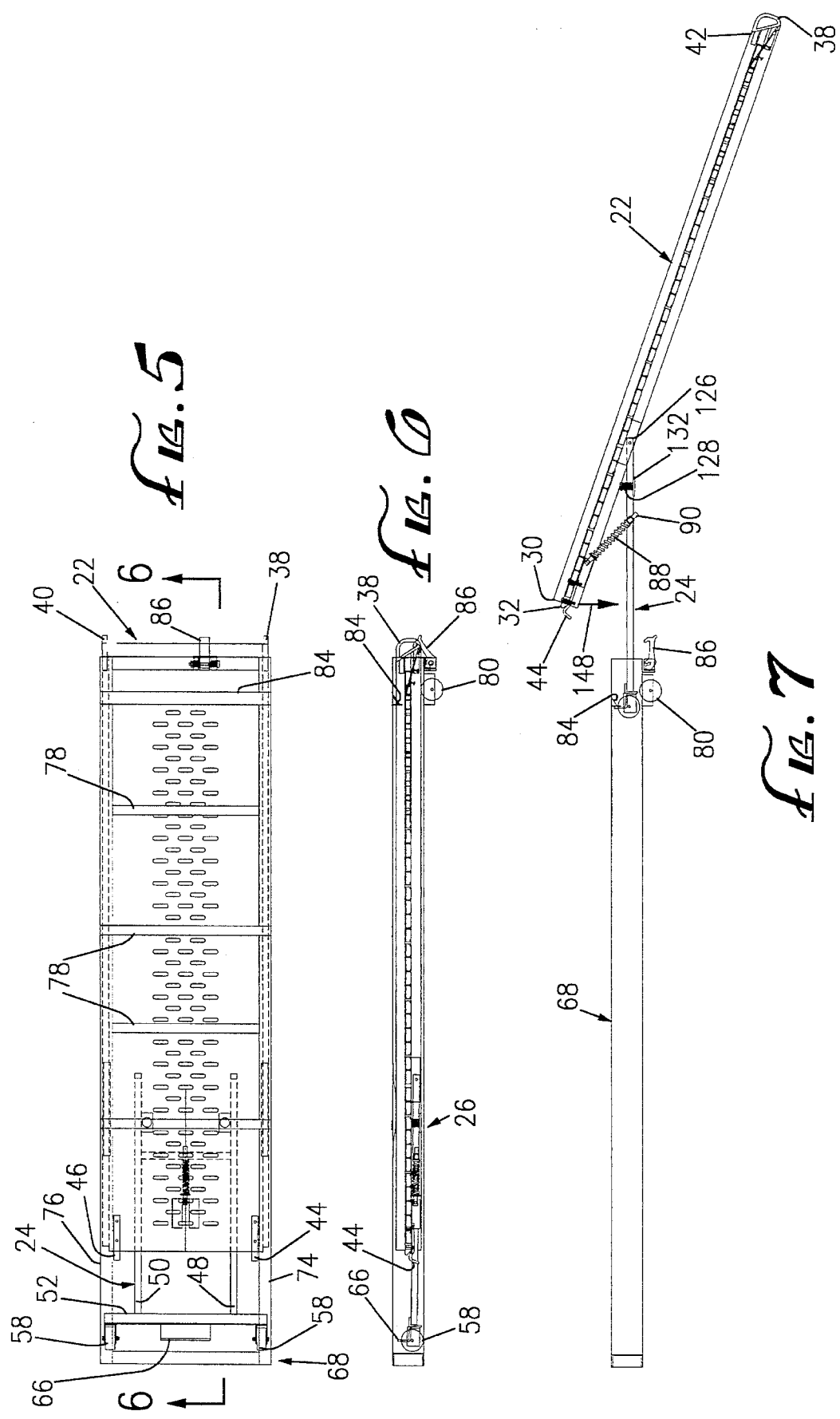

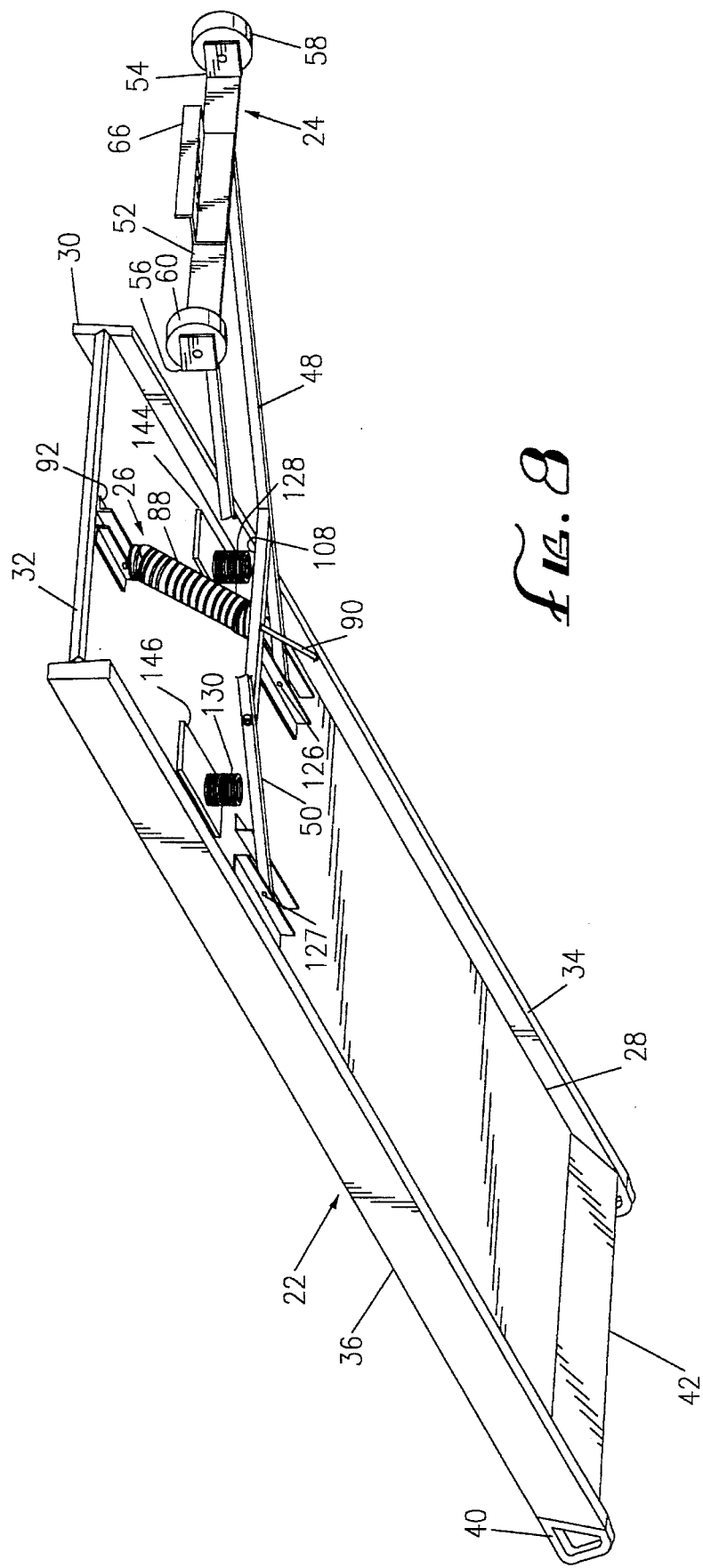

5,467,855

RAMP WEIGHT-REDUCING ASSEMBLY

BACKGROUND OF THE INVENTION

1. Field of the Invention

The field of the present invention relates to ramps, a ramp weight-reducing assembly, and, more specifically, to a weight-reducing spring assembly, attached to a ramp, to reduce the weight required to be lifted by an operator when the operator manually raises the end of the ramp to an appropriate working level.

2. Description of the Related Art

Ramps, such as walk ramps, are often provided for loading and unloading products from vehicles, e.g., trucks, trailers, boats and aircraft. In most applications, and especially in trucks and trailers, the ramp is withdrawn from a stored position by hand and the ramp nose, i.e., near the end of the truck or trailer, is lifted by hand to the level of the unloading surface. Hooks on the ramp are subsequently aligned over and inserted into holes in the edge of the truck or trailer bed. The normal force from the weight of the ramp cooperates with the hooks and holes for securing the load bearing ramp against the load bearing floor of the truck for supporting cargo therefrom.

While the ramps can be constructed of light-weight aluminum, the ramps are principally designed for load bearing support and are often heavier than can be comfortably lifted by an operator. Consequently, because of the weight and leverage factors involved, the operator often must strain to lift the ramps up into the hook holes causing an undesirable burden for him or her. Ramps for many such vehicles under such conditions can be quite heavy when designed to support objects weighing as much as 1,700 lbs.

When not in use the ramps are typically stored in a carrier located below the vehicle floor. The space available for the ramps within carriers is limited to approximately the dimensions of the ramp which, when positioned laterally, slides into the carrier.

Attempts have been made to develop new ways of lifting the ramp. One such ramp lifting device, described in Gingrich, et al., U.S. Pat. No. 5,133,634, provides structure for elevating a ramp from an initial position to the floor height of a vehicle by hand. However, because one hand must be used with the lifting device to raise the ramp, the operator then has only one hand free with which to align the hooks over the hook holes.

In many cases, ramps, within the field of the invention, are used by relatively unskilled operators and without any instruction prior to use. Therefore, it would be desirable to use a device to reduce the weight of the ramp that the operator must lift without requiring the operator to be trained in new procedures for lifting and aligning the ramp for placement of the hooks in the hook holes. In addition, the ramp nose weight must be sufficient to provide the downward normal force which cooperates with the hooks and hook holes for securing the ramp against the vehicle floor for load bearing operation. Furthermore, such a device should not require any additional steps or additional assembly once it has been installed and therefore must fit within the ramp carrier with the ramp. Finally, such a device must be relatively simple to manufacture at a low cost and have a life cycle relatively equal to the life of a vehicle ramp.

OBJECTS AND SUMMARY OF THE INVENTION

Accordingly, it is an object of the present invention to provide a weight-reducing ramp assembly which is readily available to assist an operator in positioning a ramp up into a load bearing position with minimal effort.

It is also an object of the invention to provide a weight-reducing ramp assembly which is simple, easy to manufacture and use, relatively inexpensive, durable and tough. By achieving the above-mentioned attributes, the invention easily finds its way onto standard ramps, thereby making its advantages available to a large number of operators engaged in common truck delivery activities.

The weight-reducing ramp assembly includes generally a conventional ramp storage carrier located under a vehicle floor, a ramp selectively stored in the carrier and a ramp connector coupled to the ramp and slidably secured to the ramp carrier. Structure for countering a portion of the downward normal force caused by the weight of the ramp nose is also included in the present invention to reduce the effective weight of the ramp during set-up and take-down operation.

A weight-reducing spring assembly includes a main spring, biased between the ramp and the ramp connector that cooperates to function as weight reducing means for reducing the weight of the ramp by providing a spring force in substantially the opposite direction as the downward force caused by the weight of the ramp when manually lifted by the operator. It is desirable to store the main spring in a substantially parallel arrangement with the ramp.

The weight-reducing spring assembly further includes a pair of supplemental springs for initially reducing the weight of the ramp when the main spring is near its stored position. When in the stored position, the main spring is substantially parallel with the ramp and ramp connector. The main spring is secured between the ramp connector and the underside of the ramp by structure which is capable of movably positioning the spring from a stored position substantially parallel with the ramp and ramp connector to an optimal weight reducing position substantially parallel with the force vector caused by the weight of the ramp nose. The cooperation of the weight reducing springs projects a spring biased force against the weight of the ramp to reduce the weight of the ramp actually lifted by the operator.

The ramp is manually movable between a stored position and a load-bearing operational position. The ramp is normally in the stored position located within the ramp carrier. When the ramp is to be used for load-bearing use, the ramp is withdrawn from the ramp carrier by grasping the ramp tail end. Upon fully withdrawing the ramp, the ramp tail end is lowered to the ground and the operator manually grasps opposite sides of the ramp nose end. The ramp device is then manually lifted up above the vehicle floor. The supplemental and main springs cooperate during lifting to reduce the weight required to be lifted by the operator to a comfortable level. The hooks are aligned over the hook holes. And the ramp is then-lowered to allow the weight of the ramp and the hooks engaging the holes to secure the ramp in a load bearing operational position against the vehicle floor.

BRIEF DESCRIPTION OF THE DRAWING(S)

The objects and advantages of the present invention will become more readily apparent to those ordinarily skilled in the art after reviewing the following detailed description and accompanying drawings, wherein:

FIG. 1 shows a perspective end view of a ramp of the present invention partially projecting from a carrier mounted in a vehicle body;

FIG. 2 shows a perspective top elevational view of the ramp of the invention in a load bearing position;

FIG. 5 shows a top view of the present invention in a stored position;

FIG. 6 shows a cut-away side view taken along line 6—6 of FIG. 5 of the present invention;

FIG. 7 shows the cut-away side view of FIG. 6 in a withdrawn position; and

FIG. 8 shows a partially broken-away, perspective, bottom elevational view of the present invention.

DESCRIPTION OF THE PREFERRED EMBODIMENT(S)

Figure 3:
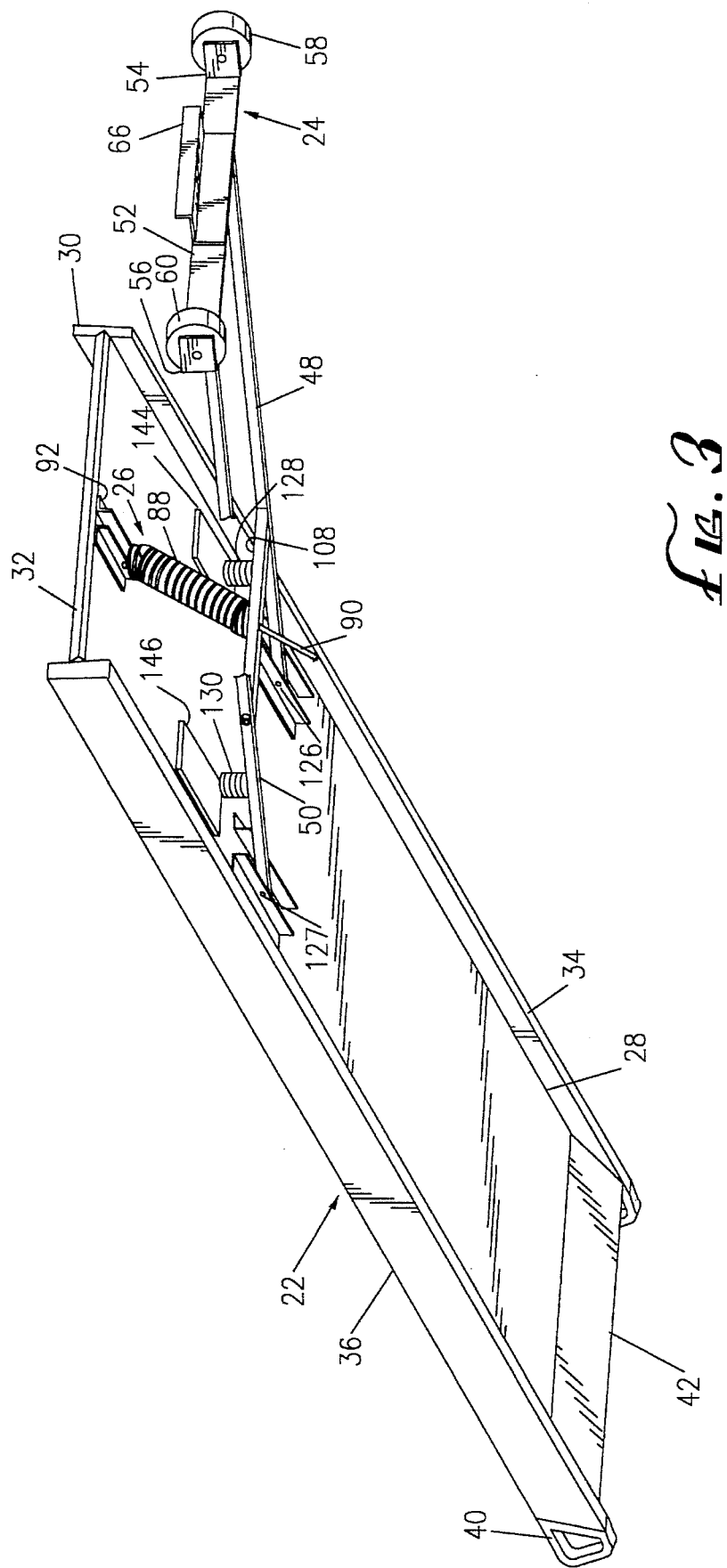
FIG. 3 shows a partially broken-away, perspective, bottom elevational view of the present invention.

Referring now in detail to the present invention with reference to the drawings, the present invention includes generally a ramp 22 (FIG. 3) coupled to a ramp connector 24. Located between the ramp and the connector is a weight-reducing spring assembly 26 positioned between the underside 28 of the ramp and coupled to the ramp connector 24. The weight-reducing spring assembly 26 functions to reduce the weight of the ramp when the ramp nose end 30 is manually raised by an operator for positioning of the ramp for load bearing use, or returning the ramp to its carrier after use.

The ramp 22 and ramp connector 24 are of a conventional design generally found on many delivery trucks and trailers. The ramp is formed with an extruded rectangular platform 32 reenforced on opposite sides by extruded side supports 34 and 36 designed with a conventional shape to increase the load bearing strength of the platform. The width, length and weight of the ramps varies according the vehicle configuration and the type of cargo loads that are to be delivered. The side supports 34 and 36 include a pair of handles 38 and 40 formed at a tail end 42 of the ramp. The opposing nose end 30 of the ramp includes a pair of L-shaped hooks 44 and 46 connected to the underside of the ramp surface and project down and away from the nose end 30 like a pair of fangs, as shown in FIGS. 5–7.

Figure 4:
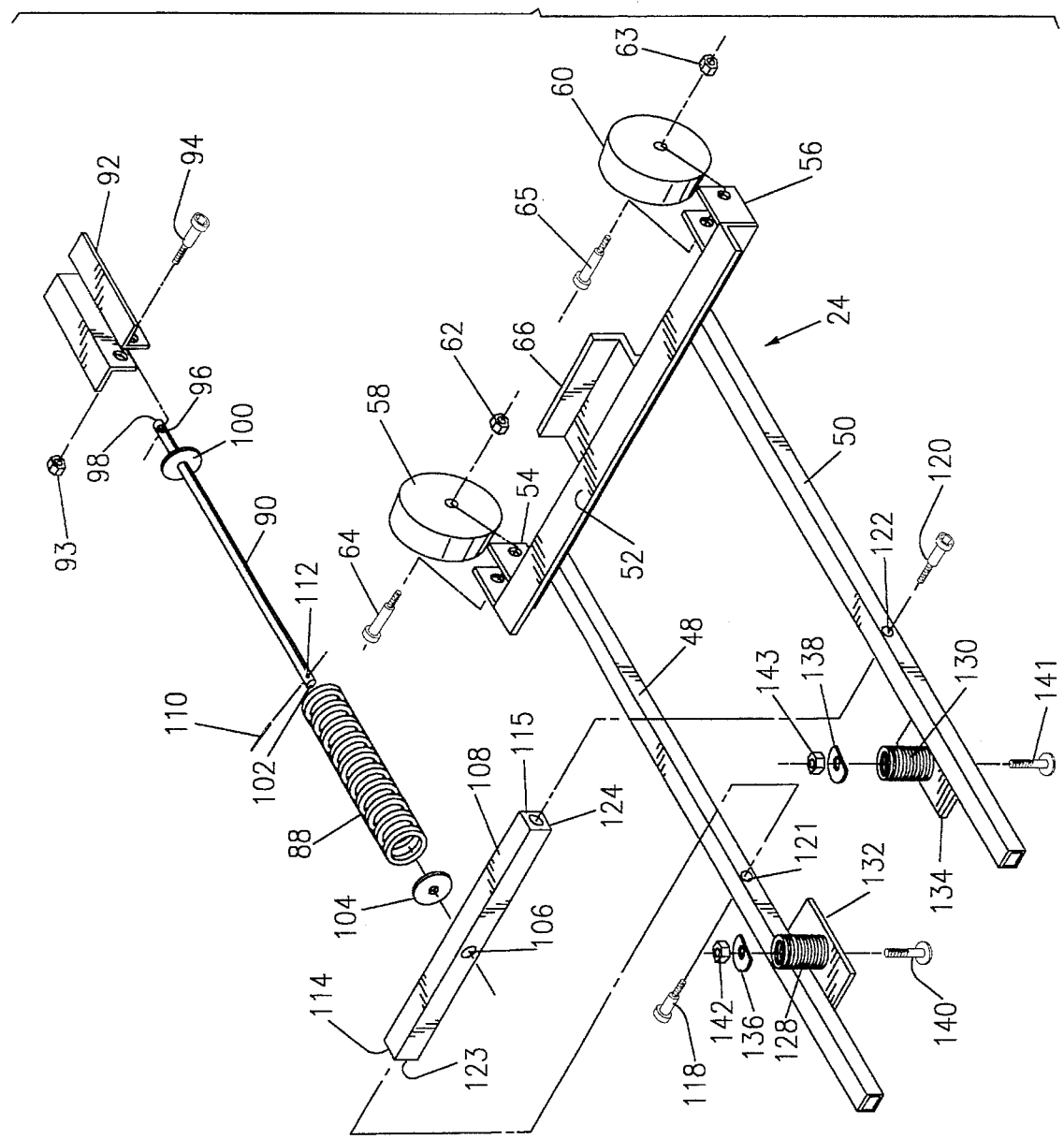
FIG. 4 shows a partial exploded perspective view of the present invention.

The ramp connector includes a pair of connector square tubes 48 and 50 pivotally connected to the ramp underside near the opposing side supports proximate the ramps nose end, as shown in FIGS. 3 and 4. The tubes 48 and 50 extend in parallel away from the ramp and connect near opposite ends to the back side of an L-shaped end bar 52 which laterally extends across the ends of the tubes and overlies the upper sides of the tubes. A pair of U-shaped axle supports 54 and 56 connect on opposite ends to the front side of the end bar 52 and extend out away from the connector tubes. A pair of wheels 58 and 60 are rotatably coupled between the axle supports 54, 56 by respective axles formed from a conventional nut 62 and 63 and bolt 64 and 65 configuration. A Z-shaped stop bar 66 is mounted centrally on the front side of the end bar 52 and extends up and away from the front end bar surface for preventing a complete withdraw of the ramp connector 24 from a ramp carrier 68.

As shown in FIG. 2, the ramp carrier 68, preferably located underneath the floor surface 70 of a delivery vehicle, provides an elongated sleeve into which the ramp connector 24 and ramp 22 are slidably inserted through an opening 72. The carrier 68 includes two opposing C-shaped side rails 74 and 76 running lengthwise underneath the truck floor and a plurality of lateral support bars 78 connect the rails laterally together. The connector wheels are aligned within the respective rails. A pair of roller guides 80 are connected near the opening 72 to the underside of the carrier 68 sliding the ramp side supports 34 and 36 thereon. A ramp carrier stop 84, shown in FIG. 6, projects down from an upper surface into the ramp storage area for contacting the ramp stop bar 66 to prevent withdraw of the ramp carriage. A spring biased latch 86, also shown in FIG. 6, is positioned near the opening for connecting the ramp tail end to the carriage for retaining the ramp in a stored position. The ramp carrier 68 stores the ramp in a secured and easily accessible location.

The weight-reducing spring assembly 26 (FIGS. 3 and 4) is mounted between the ramp connector 24 and the ramp 22. The weight-reducing spring assembly 26 includes a main spring 88 which is maintained between the ramp and ramp connector by a piston rod 90 connected to the underside of the ramp by a conventional fulcrum bracket 92 mounted on the underside of the ramp along the ramp longitudinal center axis. An axle formed from a conventional nut 93 and bolt 94 extends through a bore 96 in piston rod 90 near the upper or first end 98 of the rod. A spring stop 100 formed from a washer mounted on the rod 90 extends radially away from the axis formed by the rod 90 at a radius greater than the radius of the main spring 88. In an alternative preferred embodiment, the corner of the mounting bracket 92 can be used as the spring stop. The rod projects a lower free, or second end 102 through the longitudinal center of the main spring 88 and telescopically extends through a support washer 104 and a bore 106 formed centrally in a support bar 108. A cotter pin 110 preferably extends through a lock bore 112 at the lower or second end 102 of the rod to prevent withdraw of the rod from the support bar 108, thereby maintaining the main spring 88 between the stop 100 and support bar 108. The support bar 108 and rod 90 form an inverted T-shaped, telescoping connection. The ends 114 and 115 of the support bar 108 are coupled to connector tubes 48 and 50, as shown in FIG. 4. A pair of bolts 118 and 120 are inserted through lateral bores 121 and 122 in the connector tubes 48, 50 and are screwed into opposing threaded holes 123 and 124 formed longitudinally in opposite ends of the support bar. The placement of the piston rod mounting bracket 92 on the ramp 22 and the support bar 108 on the ramp connector 24 in relation to the ramp and ramp connector point 126 forms a triangle having an obtuse angle between the piston rod 90 and ramp connector 24, FIG. 7.

In the preferred embodiment, the dimensions of the triangle formed on one side by the piston rod 90 may be adjusted according the length and weight of the ramp. The adjustment is made by changing the position of the mounting bracket 92 on the underside of the ramp 22. For example, in a ramp having an overall length of 16 feet (FIGS. 3 and 7), the support bar 108 is generally positioned 9.25 inches from the connector points 126 and 127. The piston rod 90 when fully extended has a length of 10.25 inches and connects to the ramp 16.25 inches from the connector points 126 and A main spring having a stress characteristic of 137,954 PSI at 50% deflection is preferred due to the low and proportional reduction in spring bias force as the piston rod and spring is rotated to counter the force of the ramp weight. The relational change in rod direction with the reduction in force of the spring maintains a substantially constant weight reducing force against the ramp.

The weight-reducing spring assembly 26 further includes a pair of supplemental springs 128 and 130 mounted on respective connector tubes 48 and 50 proximate the ramp connecting points 126 and 127. Opposing mounting platforms 132 and 134 are mounted to the underside of the respective tubes and project laterally toward each other. The supplemental springs 128 and 130 are mounted overlying the platforms 132 and 134. In the preferred embodiment the springs are maintained by washers 136 and 138 having an outer diameter greater than the outer diameter of the springs. Respective bolts 140 and 141 project through holes (not shown) in the respective platforms, the spring and respective washers and are then secured by a nut 142 and 143. Respective spring support platforms 144 and 146 mounted on the underside of the ramp are aligned to contact the upwardly projecting free end of the supplemental springs.

In the preferred embodiment, the supplemental springs are also positioned to provide a constant weight reducing force in cooperation with the main spring. The supplemental spring platforms are located approximately 7.25 inches away from the connector point 126 and 127 and the springs incorporate a stress characteristic of 62,508 PSI at 50% deflection.

All of the mounted components are preferably connected by conventional arc-welding techniques. Thus the weight-reducing spring assembly may be quickly and easily attached to retrofit existing ramp equipment.

Operation

In operation, the operator will normally use the ramp 22 when making a delivery stop. The ramp will normally remain in the stored position. The operator unlatches the ramp carriage latch 86 and using the side support handles 38 and 40 withdraws the ramp. The ramp and ramp connector slide out of the carrier 68 until the downward carrier stop 84 engages the connector stop 66 thereby preventing further withdraw. The operator then puts down the tail or second end 42 of the ramp on the ground and proceeds to lift the nose or first end 30 of the ramp by manually grasping the side supports 34 and 36 of the ramp near the nose end. The weight-reducing spring assembly 26 reduces the weight of the ramp lifted by the operator throughout the lifting process completed by the operator. When first lifting the ramp, the ramp 22, ramp connector 24 and piston rod 90 are all in a nearly parallel storage position. In this arrangement the force of the main spring 88 directed along the piston rod 90 is perpendicular to the downward force 148 of the ramp weight. The supplemental springs 128 and 130, however, are directed to provide a spring bias force to counter the weight force 148 of the ramp nose.

As the ramp is lifted by the operator, the piston rod upper or first end 98 is rotated in the opposing direction of the weight force vector 148. Upon lifting the nose of the ramp to an angle of elevation sufficient for the main spring 88 to counter the weight of the ramp, the supplemental springs 128 and 130 disengage with the ramp 22 and the main spring 88 provides the full weight reducing force to reduce the weight lifted by the operator. When the ramp 22 has been fully raised over the floor surface 70 by the operator, the piston rod 90 is substantially aligned with the weight force vector 148 to maximize the effect of the main spring 88 biasing force at this position.

Upon raising the ramp 22, preferably using both hands, the operator laterally aligns the fang-like hooks 44 and 46 over floor surface holes 150 and 152 on the vehicle. The ramp is then lowered to allow the weight of the ramp to maintain the hooks within the holes of the vehicle floor. The hooks, holes and weight of the ramp all combine to provide secure engagement of the ramp with the vehicle floor surface for load bearing support.

Upon placing the ramp in a load bearing position, operator is now free to move deliveries in and out of the vehicle using the load bearing ramp. Upon completion of the delivery, the operator merely reverses the steps necessary to return the ramp to its stored position.

The cooperation of the supplemental and main springs provides a counter-acting force to the weight of the ramp at all times during lifting of the ramp by the operator. By configuring the piston rod 90 to direct the force of the main spring towards the ramp nose 30 during lifting of the ramp, the biasing force of the spring is maximized against the downward weight force of the ramp throughout the lifting process. The weight of the nose end of the ramp typically varies between 40 to 70 lbs, but could be more. However, the weight-reducing spring assembly 26 typically reduces this weight to approximately 18 lbs throughout the lifting process. The remaining 18 lbs of weight in the ramp is sufficient to provide the necessary downward force to secure the hooks within the hooks holes.

From the foregoing, it will be appreciated that the weight-reducing spring assembly of the present invention allows an operator to use both hands to manually lift a ramp of any weight while actually only lifting about 18 lbs. Further, the assembly is fully automatic and requires no adjustment or assembly during use. Since the weight-reducing spring assembly stores in the existing ramp carrier, it can be attached to retrofit existing ramp equipment with minimal effort. In an alternative embodiment, each of the supplemental springs 128 and 130 (FIG. 8) connect to the ramp at a first end and include a second end projecting towards the ramp connector to apply a biasing force between the ramp and ramp connector during an initial lifting period.

While a particular form of the invention has been illustrated and described, it will be apparent that various modifications can be made without departing from the spirit and scope of the invention. Accordingly, it is not intended that the invention be limited, except by the claims appended herein.

What is claimed is:

1. A ramp weight-reducing assembly for use with a front portion of a ramp having a predetermined weight to reduce the weight manually lifted by an operator raising said front portion to a working surface, said weight-reducing ramp assembly comprising:

a ramp connector pivotally connected to said ramp;

weight reducing means for reducing the weight lifted by an operator when raising said from portion of said ramp, by applying a biasing force to the ramp and connected between said ramp and ramp connector;

engaging means for connecting said front portion of said ramp to said working surface;

whereby said weight reducing means opposes the force of said predetermined weight of said ramp by applying said biasing force before and during a period when said operator manually lifts said ramp and engages said front portion of said ramp with said working surface.

2. The ramp weight reducing assembly of claim 1 wherein said weight reducing means includes a support bar rotatably connected to said ramp connector formed with a bore traversing a longitudinal axis of said support bar;

a piston rod having a top end pivotally connected to said ramp and a bottom end telescopically traversing said bore;

a stop located proximate to the piston rod top end;

a main spring maintained concentrically about the longitudinal axis of said piston rod between said stop and said support bar whereby said main spring applies a biasing force between said stop and said support bar.

3. The ramp weight-reducing assembly of claim 1 wherein:

each of said respective supplemental springs includes a first end connected to said ramp connector and a second end extending towards said ramp such that during said initial lifting period said second end engages said ramp and applies said biasing force between said ramp connector and said ramp.

4. The ramp weight-reducing assembly of claim 1 wherein:

each of said respective supplemental springs includes a first end connected to said ramp and a second end extending towards said ramp connector such that during said initial lifting period, said second end engages said ramp connector and applies said biasing force between said ramp connector and said ramp.

5. The ramp weight-reducing assembly of claim 2 wherein said main spring is rotatable between a stored position parallel with said ramp and an operational position to oppose the force of the ramp weight.

6. The ramp weight-reducing assembly of claim 1 wherein said engaging means includes hooks connected on the end of said front portion of said ramp, hook receiving apertures formed in said working surface and said front portion of said ramp having a weight greater than the biasing force of weight reducing means to maintain said hooks in overlying engagement with said hook apertures.

7. The weight-reducing assembly of claim 1 wherein said weight reducing means includes respective supplemental springs, each positioned between said front portion of said ramp and said ramp connector, such that said respective supplemental springs apply said biasing force throughout an initial period when said ramp and said ramp connector are in a generally parallel position to reduce the weight of said ramp manually lifted by said operator.

* * * * *